(12) United States Patent
Garrisi et al.

(10) Patent No.: US 10,933,926 B2
(45) Date of Patent: Mar. 2, 2021

(54) TWIST BEAM AIR GUIDED TUNNEL DIFFUSER

(71) Applicant: MAHINDRA VEHICLE MANUFACTURERS LIMITED, Maharashtra (IN)

(72) Inventors: Matthew Garrisi, Canton, MI (US); Vasantha Ganesh Jayasankaran, Rochester Hills, MI (US)

(73) Assignee: MAHINDRA & MAHINDRA LIMITED, Maharashta (IN)

( * ) Notice: Subject to any disclaimer, the term of this patent is extended or adjusted under 35 U.S.C. 154(b) by 0 days.

(21) Appl. No.: 16/411,228

(22) Filed: May 14, 2019

(65) Prior Publication Data

US 2019/0351954 A1 Nov. 21, 2019

Related U.S. Application Data

(60) Provisional application No. 62/671,507, filed on May 15, 2018.

(51) Int. Cl.
 *B62D 35/02* (2006.01)
(52) U.S. Cl.
 CPC ............... *B62D 35/02* (2013.01); *Y02T 10/82* (2013.01)
(58) Field of Classification Search
 CPC .. B60G 21/051; B62D 35/001; B62D 35/002; B62D 35/02; Y02T 10/82
 USPC .................................................... 296/180.1
 See application file for complete search history.

(56) References Cited

U.S. PATENT DOCUMENTS

| | | | | |
|---|---|---|---|---|
| 5,954,405 A * | 9/1999 | Toman | ................... | B60R 11/00 301/6.3 |
| 9,415,650 B2 * | 8/2016 | Bromme | ............... | F16D 65/128 |
| 9,643,664 B2 * | 5/2017 | Tesch | ..................... | B60G 7/001 |
| 9,902,225 B2 * | 2/2018 | Riegelsberger | ........ | B62D 35/02 |
| 10,246,136 B2 * | 4/2019 | Scholz | .................. | B60G 7/001 |
| 10,787,208 B2 * | 9/2020 | Nishida | .................. | B60G 7/001 |
| 2011/0309652 A1 * | 12/2011 | Eichentopf | ............ | B62D 35/02 296/180.1 |

(Continued)

FOREIGN PATENT DOCUMENTS

| DE | 102016214424 A1 | 2/2018 |
|---|---|---|
| EP | 2557022 A1 | 2/2013 |

(Continued)

*Primary Examiner* — Jason S Daniels
(74) *Attorney, Agent, or Firm* — Dickinson Wright PLLC

(57) ABSTRACT

An air diffuser assembly for attachment to a twist beam on a rear suspension system of an automobile that reduces the coefficient of drag (Cd) as the automobile is being driven. The air diffuser assembly includes an wind deflection portion that includes a top longitudinal edge and a bottom longitudinal edge being spaced apart by a pair of lateral edges. The main body further includes a first slope extending outwardly and downwardly from the top longitudinal edge and a second slope extending outwardly and upwardly from the bottom longitudinal edge. The first slope and second slope meet at an edge for deflecting an airflow across both the first slope and the second slope. The wind deflection portion includes an air tunnel diffuser defining an air passage for guiding airflow therethrough and directing it behind the automobile away an undercarriage of the automobile to further reduce the coefficient of drag (Cd).

20 Claims, 18 Drawing Sheets

(56) References Cited

U.S. PATENT DOCUMENTS

2016/0339972 A1* 11/2016 Beckon ................ B62D 35/02
2018/0361817 A1   12/2018 Katkar et al.

FOREIGN PATENT DOCUMENTS

| EP | 2765065 A2 | 8/2014 | |
| FR | 2997345 A1 * | 5/2014 | ........... B60G 21/051 |
| FR | 3076806 A1 * | 7/2019 | ............ B60G 9/027 |
| JP | 2005053321 A * | 3/2005 | ........... B60G 21/051 |
| KR | 101510005 B1 | 4/2015 | |
| KR | 1020170036845 A | 4/2017 | |

* cited by examiner

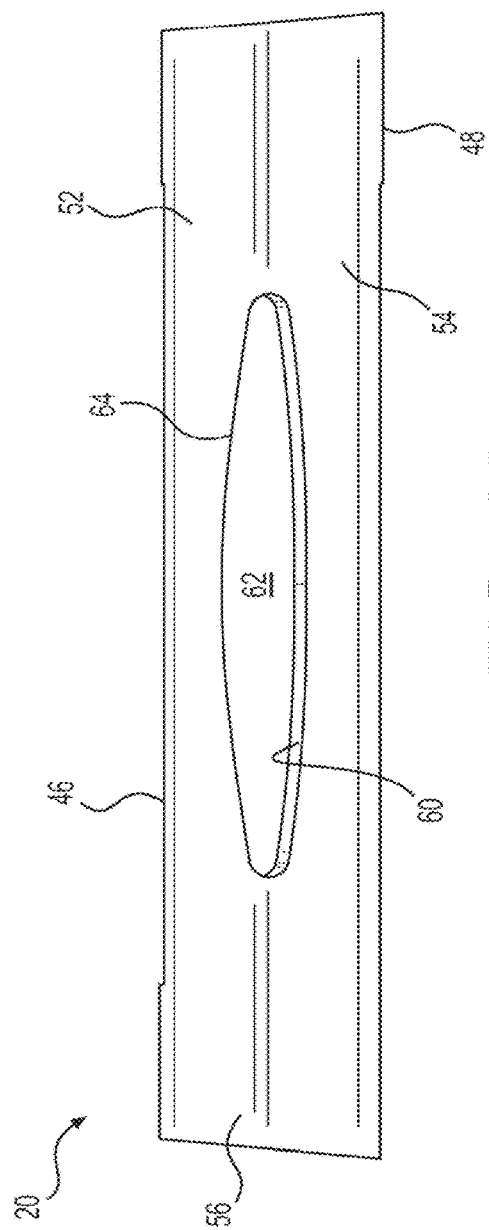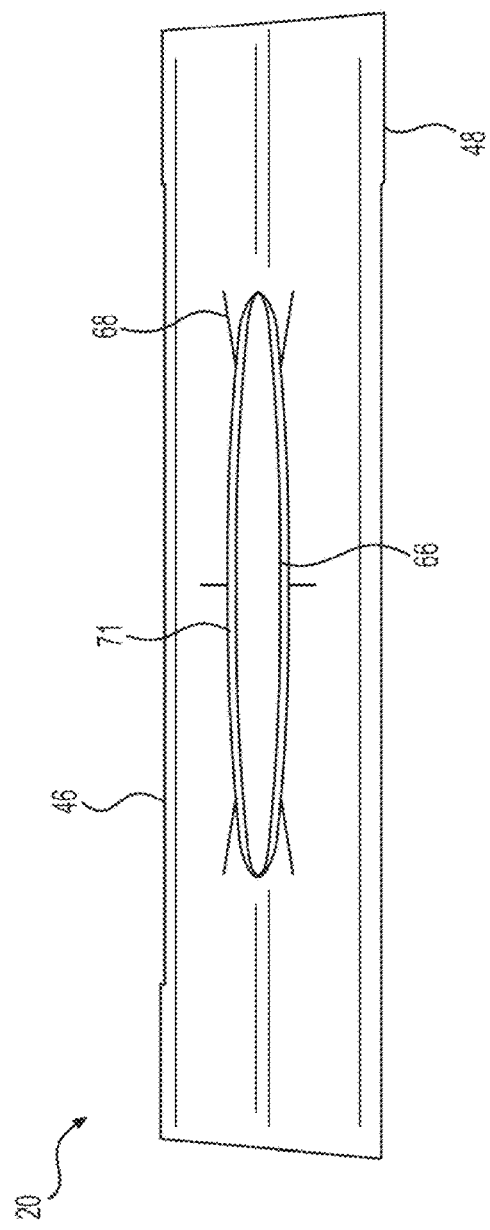

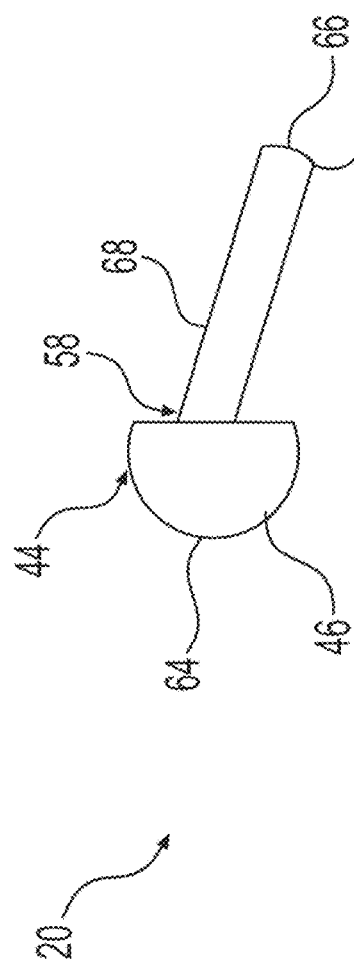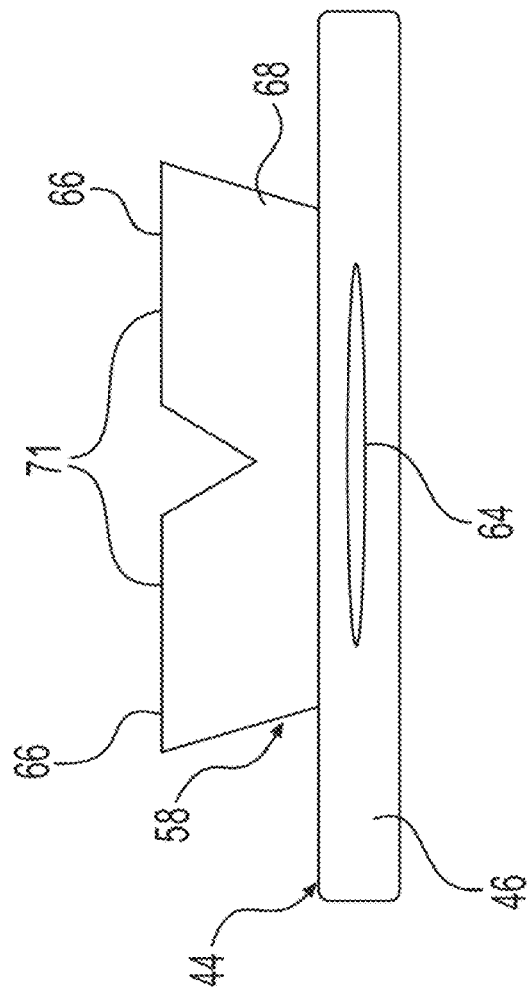

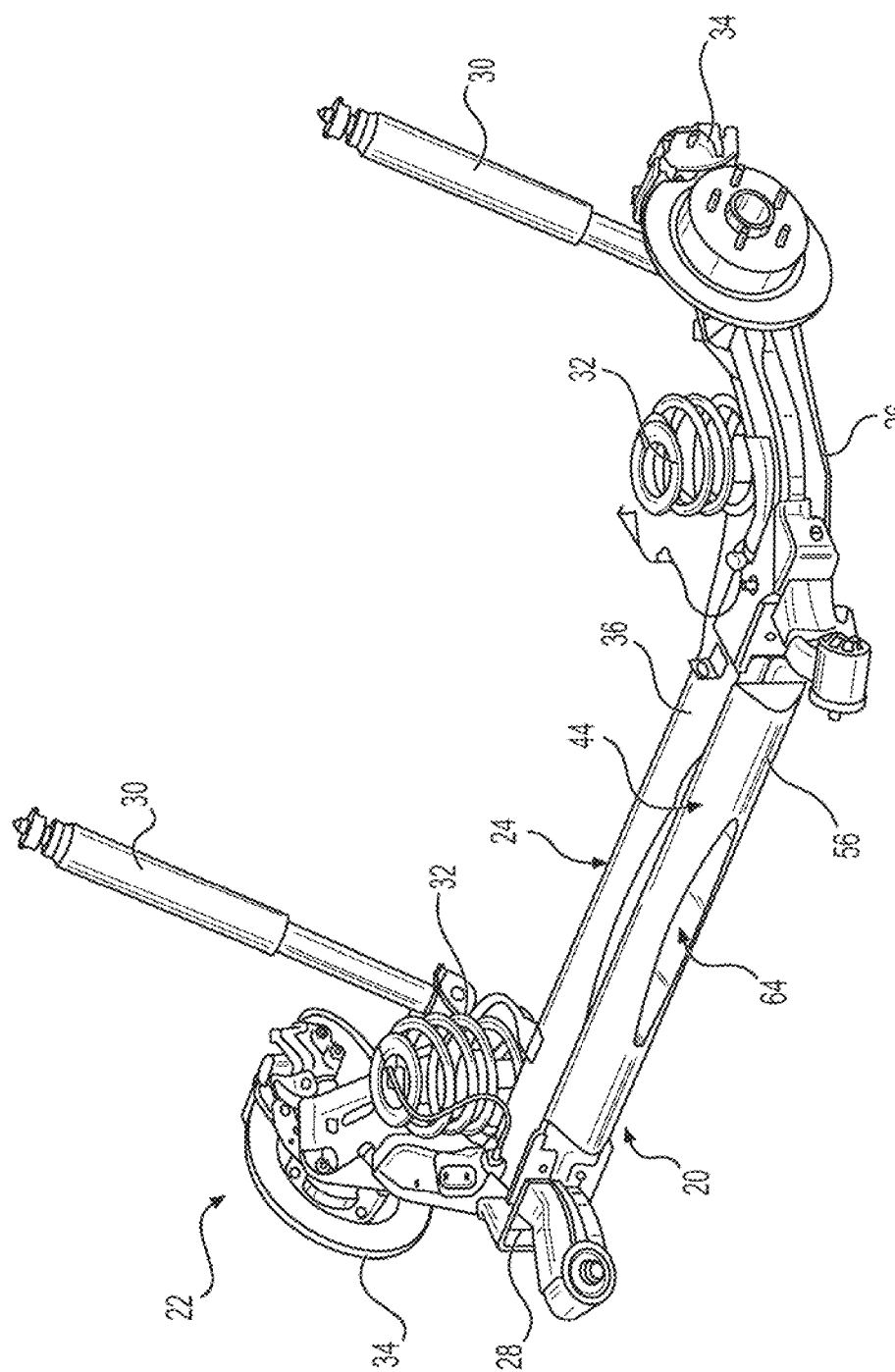

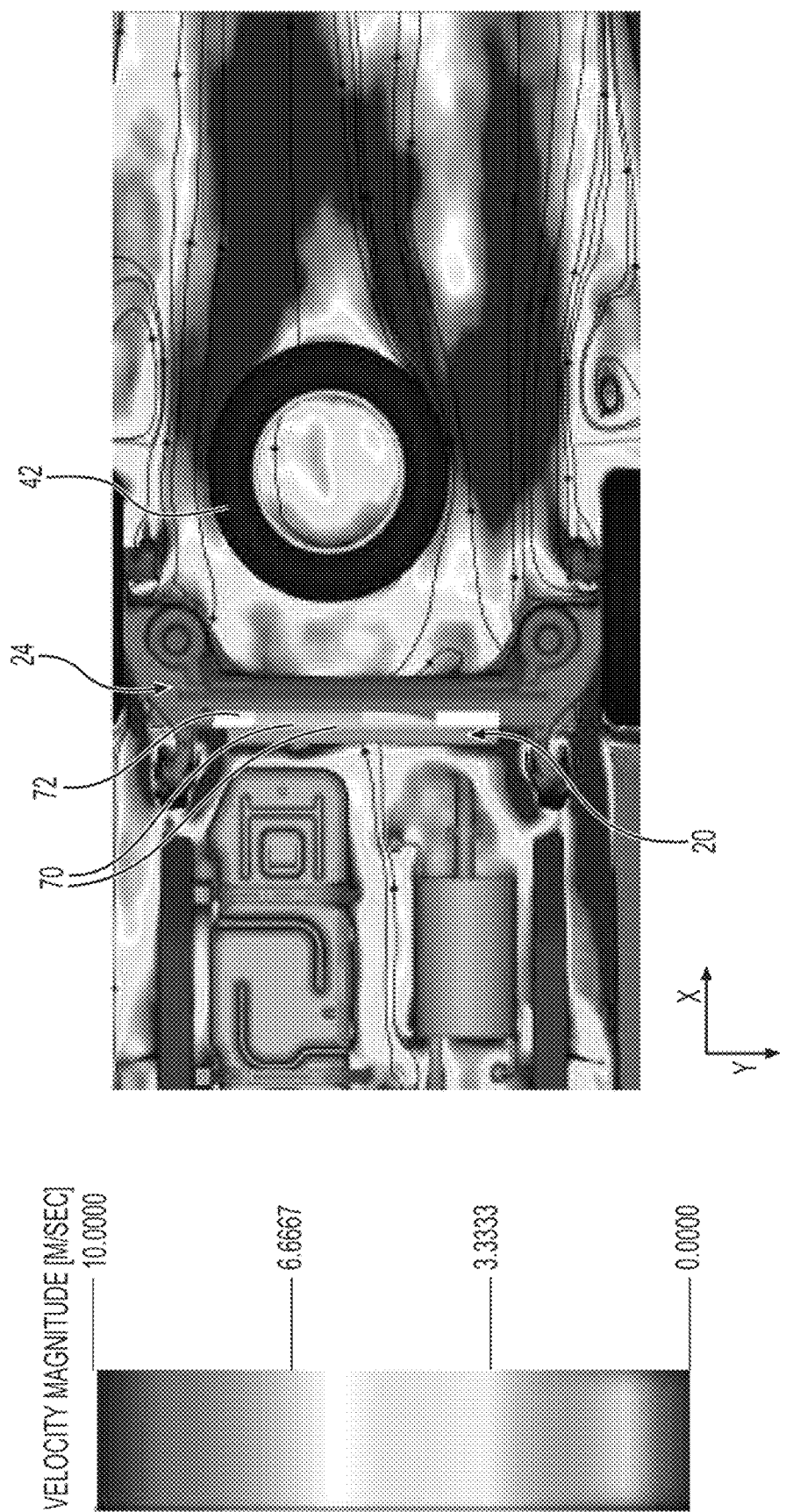

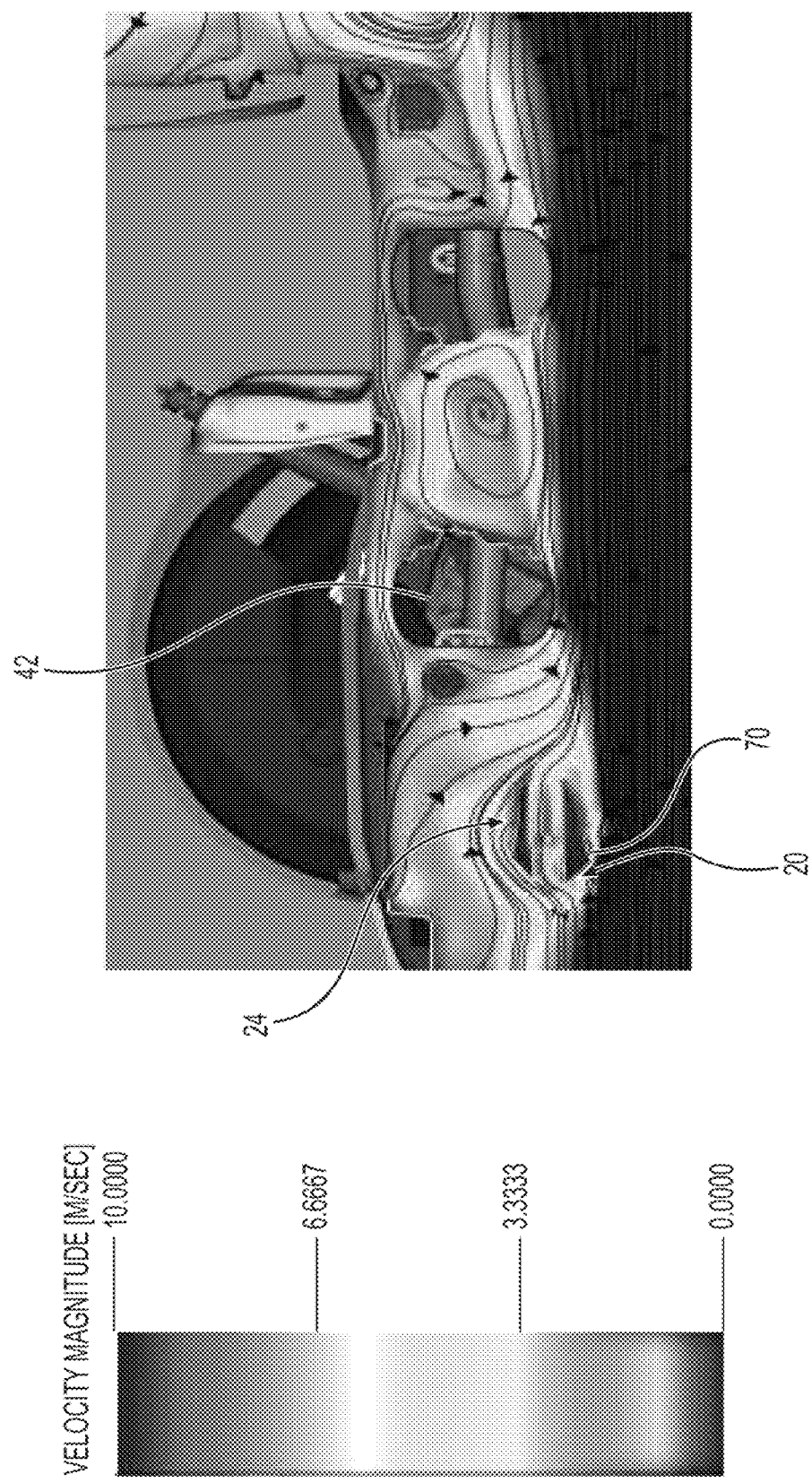

TWIST BEAM AIR GUIDED TUNNEL DIFFUSER

CROSS-REFERENCE TO RELATED APPLICATION

This U.S. patent application claims priority to and the benefit of U.S. provisional patent application No. 62/671,507, filed May 15, 2018, the entire disclosure of which is incorporated herein.

BACKGROUND OF THE INVENTION

1. Field of the Invention

The invention relates generally to an air guided tunnel diffuser for attachment to a twist beam of an automobile.

2. Related Art

This section provides background information related to the present disclosure which is not necessarily prior art.

As technology continues to advance in the automotive industry and as the price of fossil fuels increase, there is a continuing desire to increase fuel economy. This desire to increase fuel economy is both economically and environmentally motivated and has advanced internal components in automobiles as evidenced by hybrid and electric driving systems. In addition to increases in motor efficiency and reliance on electric power, fuel economy has been increased through a reduction of weight in automotive components and by streamlining exterior automotive bodies such that they experience a reduction in wind resistance. In addition to decreasing fuel requirements, a reduction of wind resistance or drag diminishes vibrations associated with driving at higher speeds, experienced by a driver as turbulence, and also reduces the interference of wind on steering. The study of wind resistance, or aerodynamics, has driven engineers to design modern automobile bodies with rounded edges, modified exterior components, and to include spoilers. The end-goal of these design choices is to produce an automobile with low drag, which is measured as a "coefficient of drag" (Cd). A reduction in Cd is directly correlated to a reduction in fuel usage particularly when the automobile is driving fast or directly into strong winds.

One often overlooked area of an automobile that adds significantly to an overall Cd is the undercarriage. Depending on the make of the automobile, the undercarriage can experience a positive lift, essentially being an airstream that travels under and lifts the weight of the automobile upwards, making it hard to control. Automobiles can also experience an opposite "downward force" that pushes the automobile downwardly towards a driving surface, increasing traction between the tires and the driving surface but at the cost of increased Cd. Attempts to balance these conflicting forces have led to developments in front bumper designs that include lower profiles and aerodynamic shapes. One part of the undercarriage that continues to increase the Cd is part of a rear suspension system called a "twist beam," which is directly exposed to the airstream in most modern automobiles. The twist beam commonly has an open C-shaped cross-section that faces the opposing direction of the airstream path thus obstructing the flow of the airstream and generating undesirable turbulence. The twist beam can typically produce a localized Cd value up to 2.3 at an automobile speed of 112 kph. Thus, not only is significant Cd added by the twist beam but the obstructed airstream is redirected to other undercarriage or underbody components such as a spare wheel, a rear fascia diffuser, etc., thus disturbing the wake pattern behind the automobile and further increasing the overall Cd of the automobile.

Therefore, there remains a continuing need to improve the aerodynamic performance of the twist beam to reduce the overall Cd of the automobile, particularly via a reduction of the Cd of the undercarriage.

SUMMARY OF THE INVENTION

This section provides a general summary of the inventive concepts associated with this disclosure and is not intended to be interpreted as a complete and comprehensive listing of all of its aspects, objectives, features, and advantages.

The invention provides an air diffuser assembly for attachment to a twist beam on a rear suspension system of an automobile. The air diffuser assembly includes a main body having a wind deflection portion that is forward facing when the main body is attached to the twist beam for distributing an airflow. An air tunnel diffuser extends from the wind deflection portion and includes an interior wall delimiting an air passage that extends through the main body to guide a portion of the airflow through the wind deflection portion and behind the automobile.

As it will be appreciated, the invention delivers a decreased coefficient of drag (Cd) to a rear suspension system of an automobile. More particularly, the air diffuser assembly can be attached to a twist beam of the rear suspension system in order to decrease the overall Cd while the automobile is being driven. The reduction of Cd allows for increased fuel economy, reduced turbulence, and easier steering of the automobile.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4A is an enlarged front view of the air tunnel diffuser;

FIG. 4B is an enlarged back view of the air tunnel diffuser;

FIG. 4C is a side view of the air tunnel diffuser having a tail extending at an angle from a main body that attaches to the twist beam;

FIG. 4D is a top view of another embodiment of the tail including a split;

FIG. 5 is a perspective view of the air diffuser assembly attached to the twist beam;

FIG. 16 is a bottom view of the automobile undercarriage including a graphical representation of the airstream around the air diffuser assembly having guide blades along the XY-plane; and FIG. 17 is a side view of the automobile undercarriage including a graphical representation of the airstream around the air diffuser assembly having guide blades along the XZ-plane.

DESCRIPTION OF THE ENABLING EMBODIMENT

Figure 1:
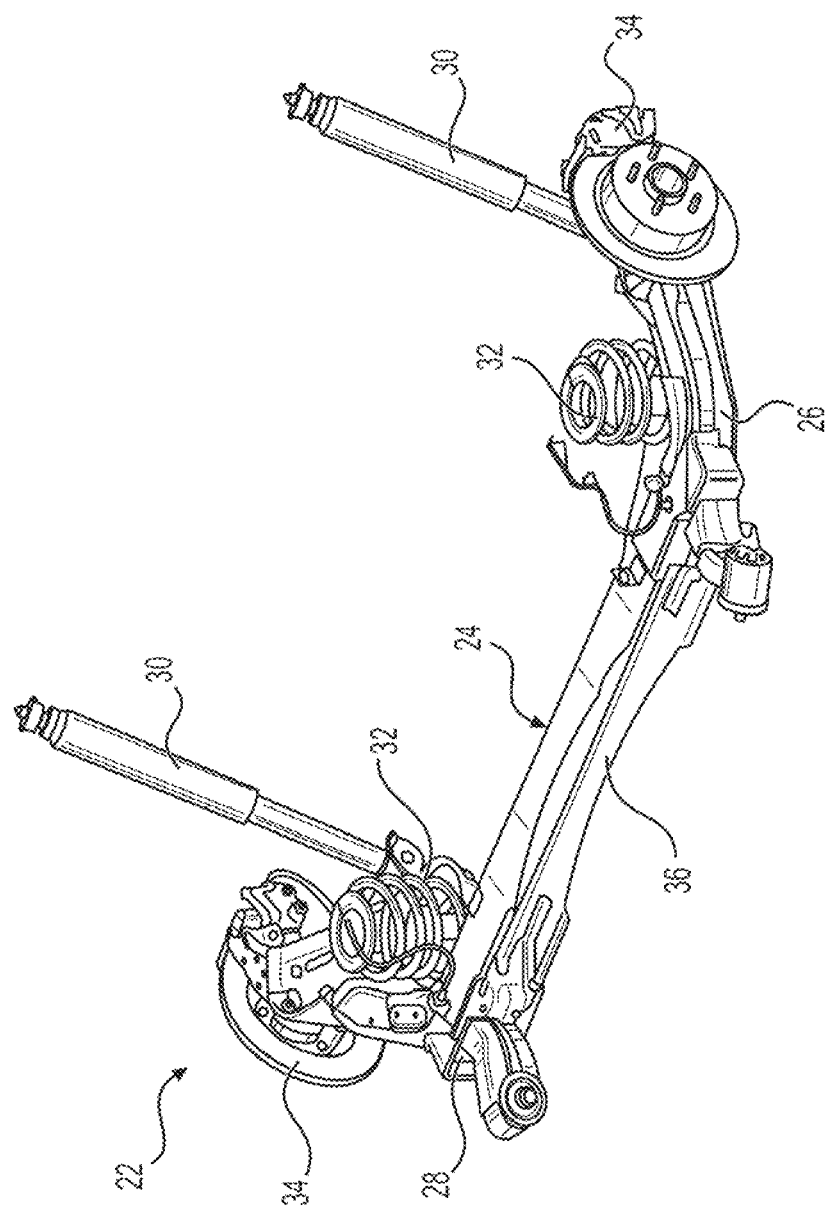
FIG. 1 is a perspective view of a rear suspension system including a twist beam.

Example embodiments will now be described more fully with reference to the accompanying drawings. In general, the subject embodiments are directed to an air diffuser assembly for attachment to a twist beam of a rear suspension system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the air diffuser assembly 20 is intended to decrease the coefficient of drag (Cd) of a rear suspension system 22 of an automobile. More particularly, the diffuser assembly 20 decreases the Cd of a rear suspension system 22 via attachment to a twist beam 24. As it will be appreciated with further reading, this reduction of the Cd from the present invention allows for increased fuel economy, reduced turbulence, and easier steering of the automobile. Moreover, the present invention can be incorporated into existing twist beams 24 without requiring complete replacement of conventional rear suspension systems 22.

Figure 2:
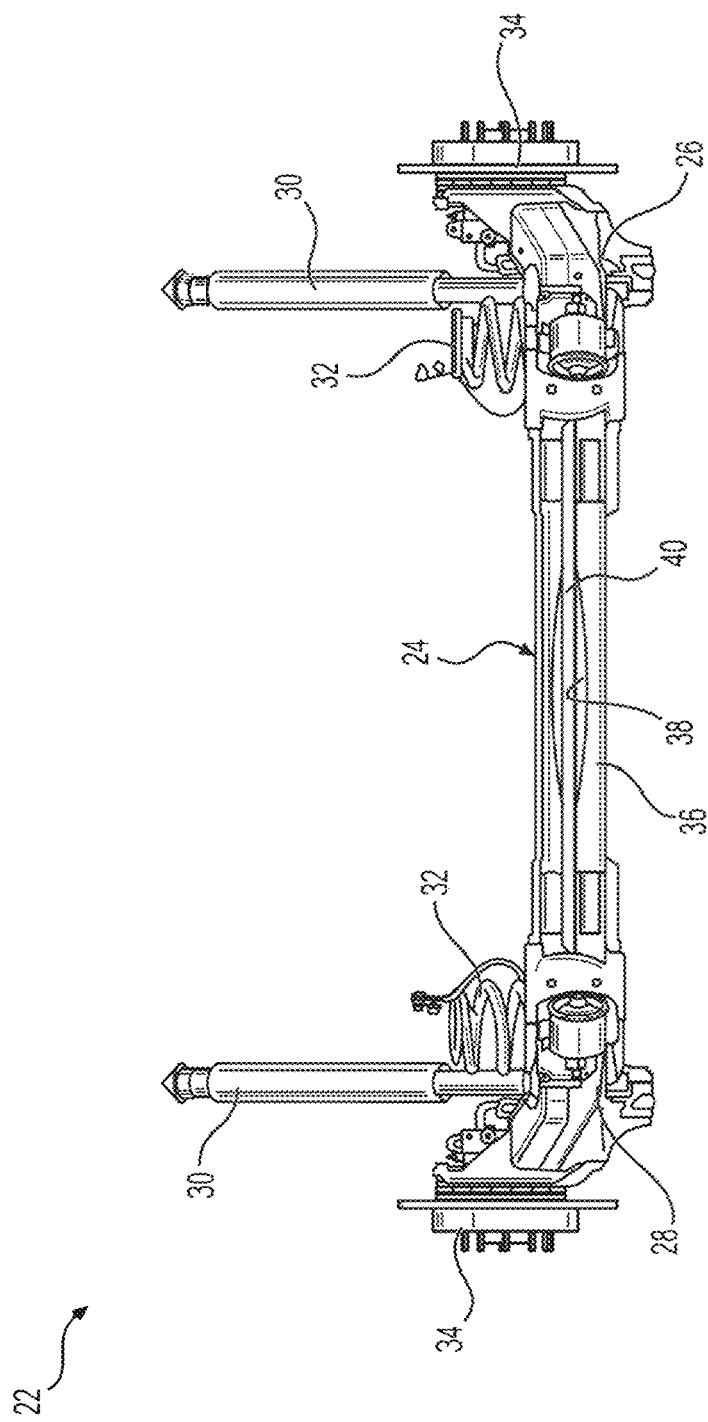
FIG. 2 is a front view of the rear suspension system illustrating a slit in the twist beam.

A perspective view of the rear suspension system 22 of an automobile is illustrated in FIG. 1 and a front view is illustrated in FIG. 2. The twist beam 24 of the rear suspension system 22 extends between a first end 26 and a second end 28. Each end 26, 28 of the twist beam 24 is located next to a shock absorber 30, a coil spring 32, and a brake assembly 34 of the rear suspension system 22. The twist beam 24 includes a middle portion 36 extending between the ends 26, 28 that defines an open C-shaped cross-section common in traditional twist beams that faces towards a front suspension system (not shown). As best illustrated in FIG. 2, the middle portion 36 defines a slit 38 and includes a sway bar 40 disposed within the C-shape adjacent to the slit 38. Because during movement of the automobile the twist beam 24 faces the opposing direction of an airstream path, the flow of the airstream is obstructed. This obstruction results in a high Cd value that generates undesirable turbulence that is experienced by the driver and a loss of fuel economy.

Figure 12:
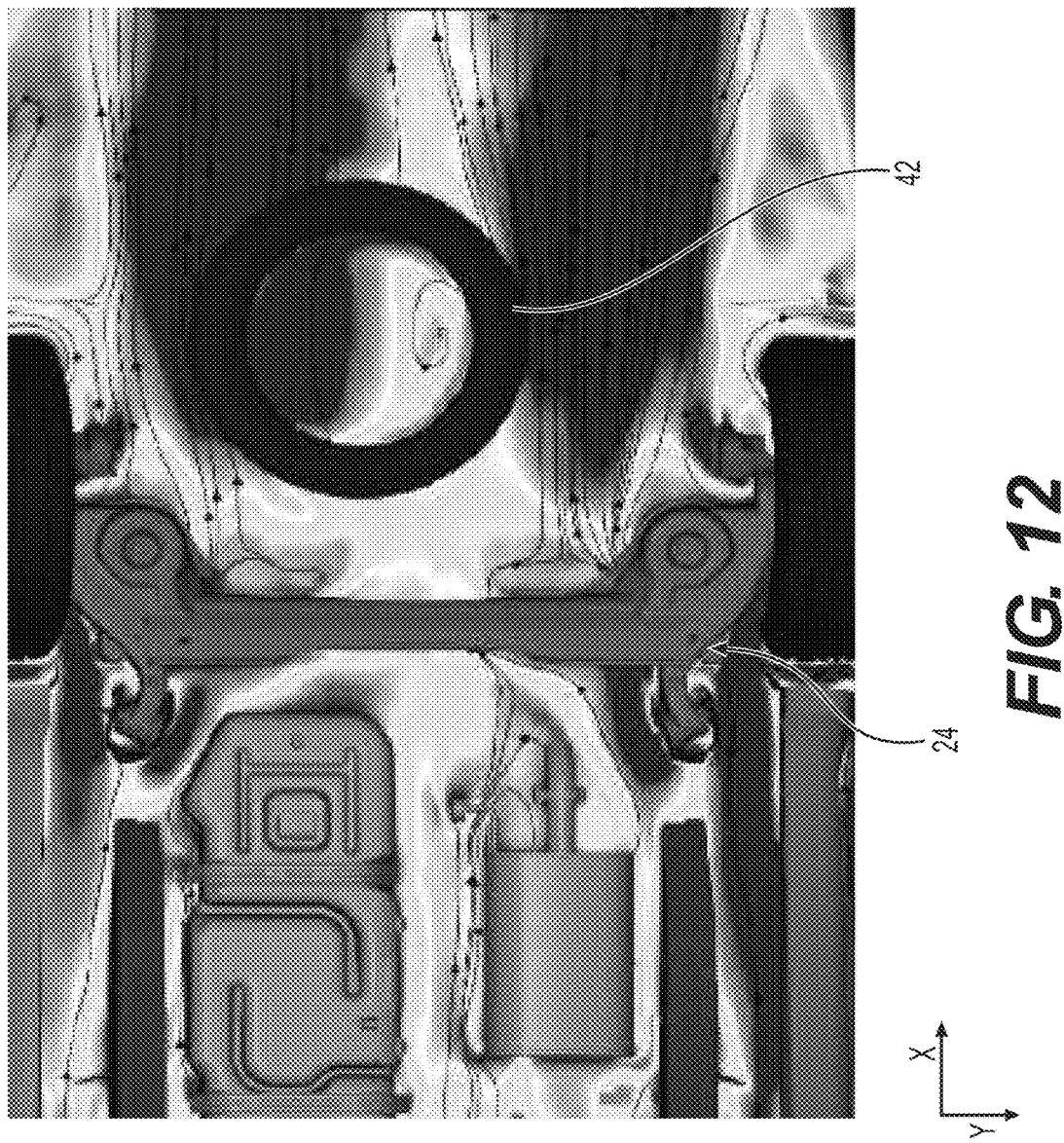
FIG. 12 is a bottom view of an automobile undercarriage including a graphical representation of the airstream around a twist beam without the presence of an air diffuser assembly along an XY-plane.
Figure 13:
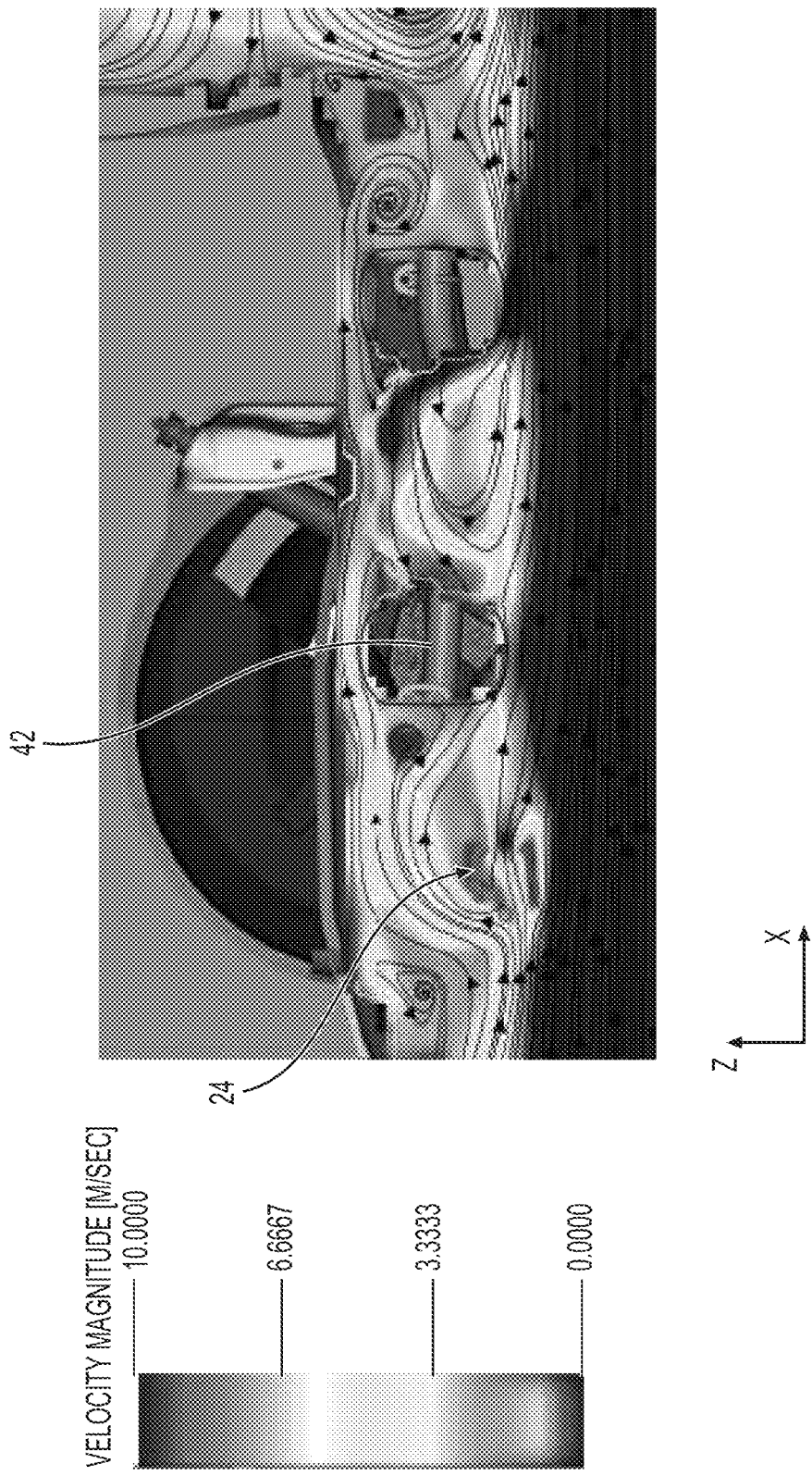
FIG. 13 is a side view of the automobile undercarriage including a graphical representation of the airstream around the twist beam along an XZ-Plane.

FIGS. 12 and 13 both illustrate the obstruction to the airstream resulting from the twist beam 24 with an open C-shaped cross-section and a spare tire 42 located rearward from the twist beam 42. Specifically, FIG. 12 illustrates the airstream along a XY-plane from a bottom view perspective as a function of air velocity. Likewise, FIG. 13 illustrates the airstream along a XZ-plane from a side view perspective as a function of air velocity. Tests performed at 112 kph indicate a Cd value of 0.348. The Cd value is at least partially increased via the airstream coming into direct contact with the twist beam 24 and further increased via the deflected airstreams interaction with a spare tire and other portions of the automobile undercarriage.

Referring now to FIGS. 3 through 6, an air diffuser assembly 20 is presented for attachment to a forward facing portion of the twist beam 24. The air diffuser assembly 20 includes a main body 44 having a top longitudinal edge 46 and a bottom longitudinal edge 48 being spaced apart by a pair of lateral edges 50. The main body 44 includes a wind deflection portion 56 that extends between the edges 46, 48, and 50 and is forward facing when the air diffuser assembly 20 is attached to the twist beam 24. The wind deflection portion 56 includes a first slope 52 extending outwardly and downwardly from the top longitudinal edge 46 and a second slope 54 extending outwardly and upwardly from the bottom longitudinal edge 48. The first slope 52 and second slope 54 meet centrally on an median edge 57 for distributing the airflow to both the first slope 52 and the second slope 54. The wind deflection portion 56 is shown as having a bulbous or radial shape but it could also be triangular, ramp-shaped, flat, and other shapes without departed from the subject disclosure.

Figure 3:
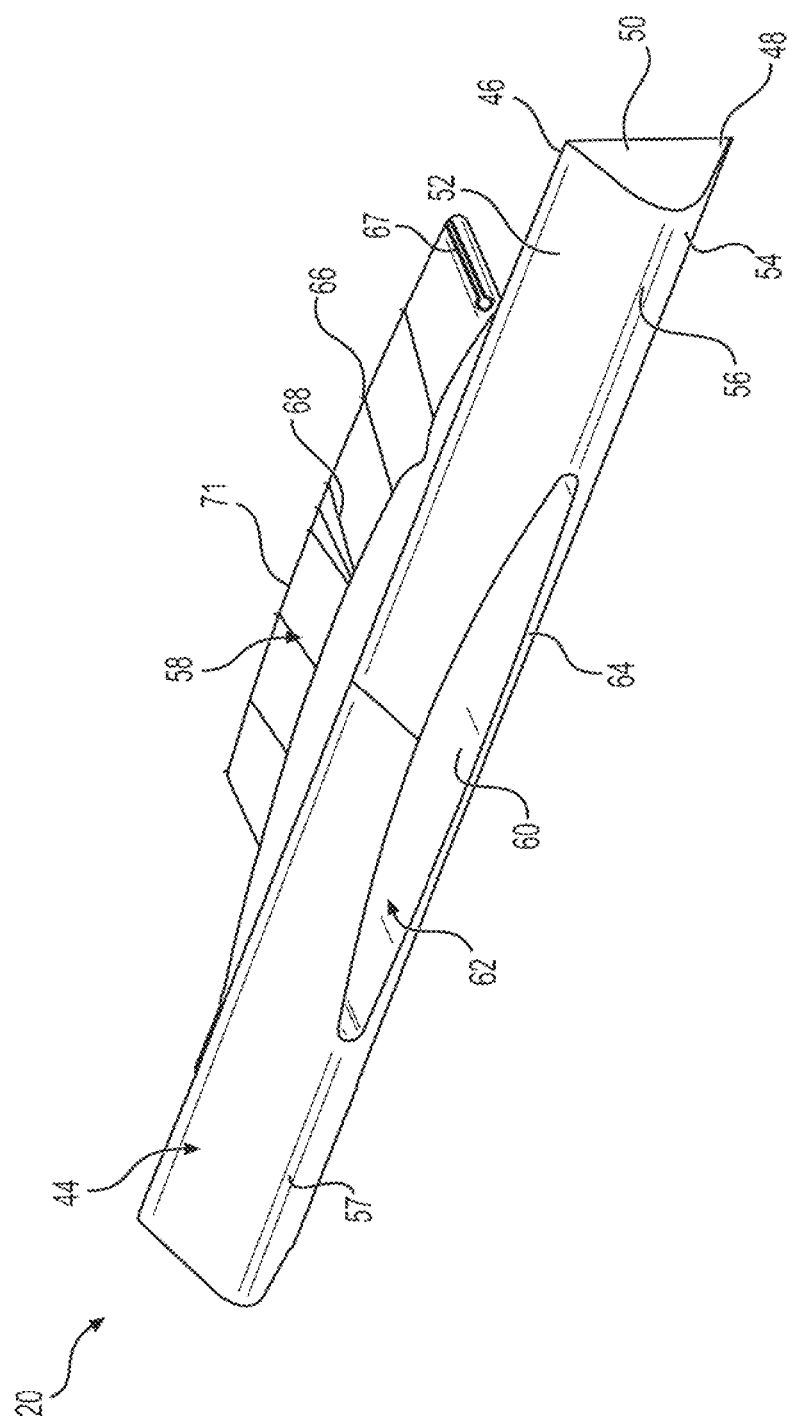
FIG. 3 is a perspective view of an air diffuser assembly having a tunnel diffuser.
Figure 6:
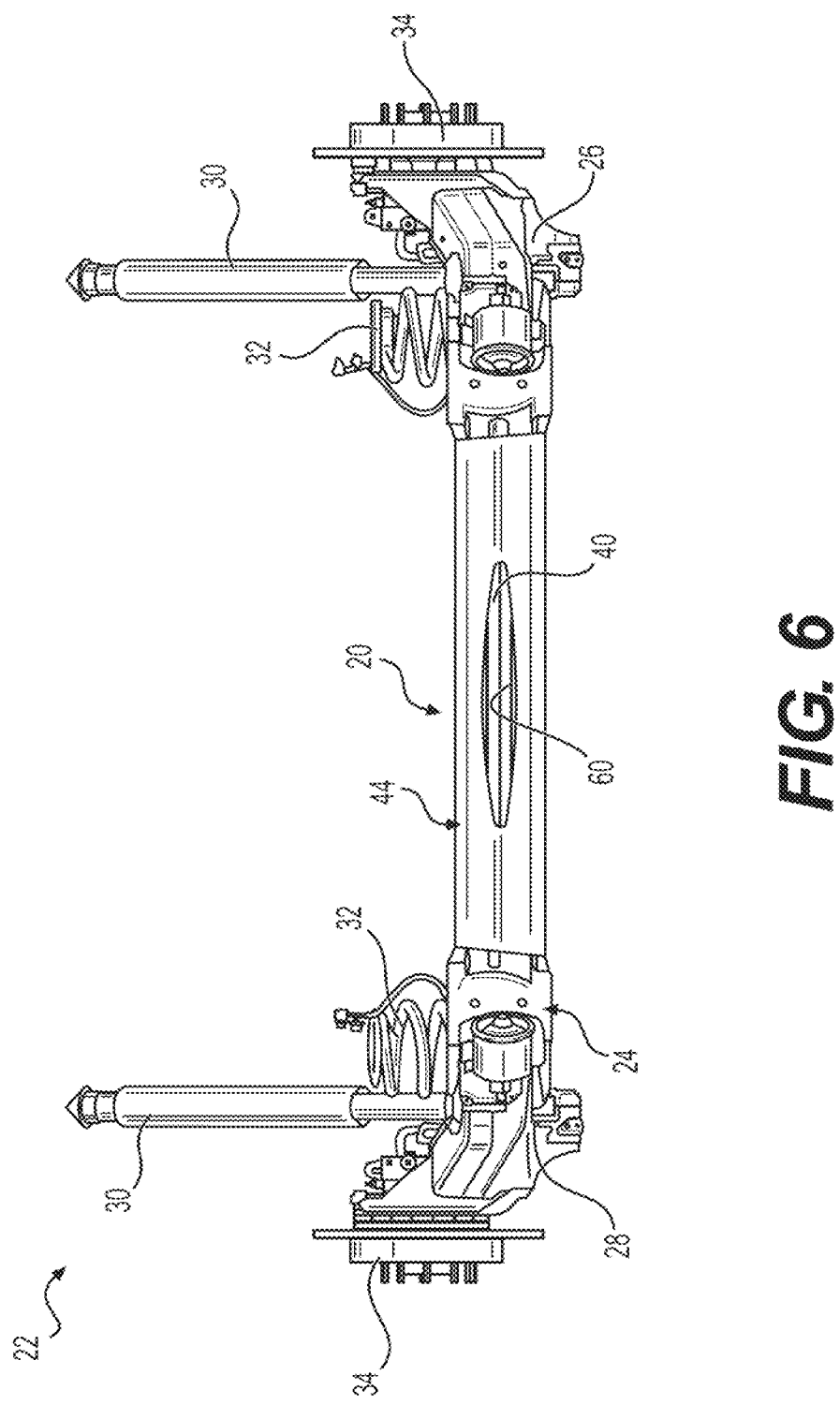
FIG. 6 is a front view of the air diffuser assembly attached to the twist beam.
Figure 7:
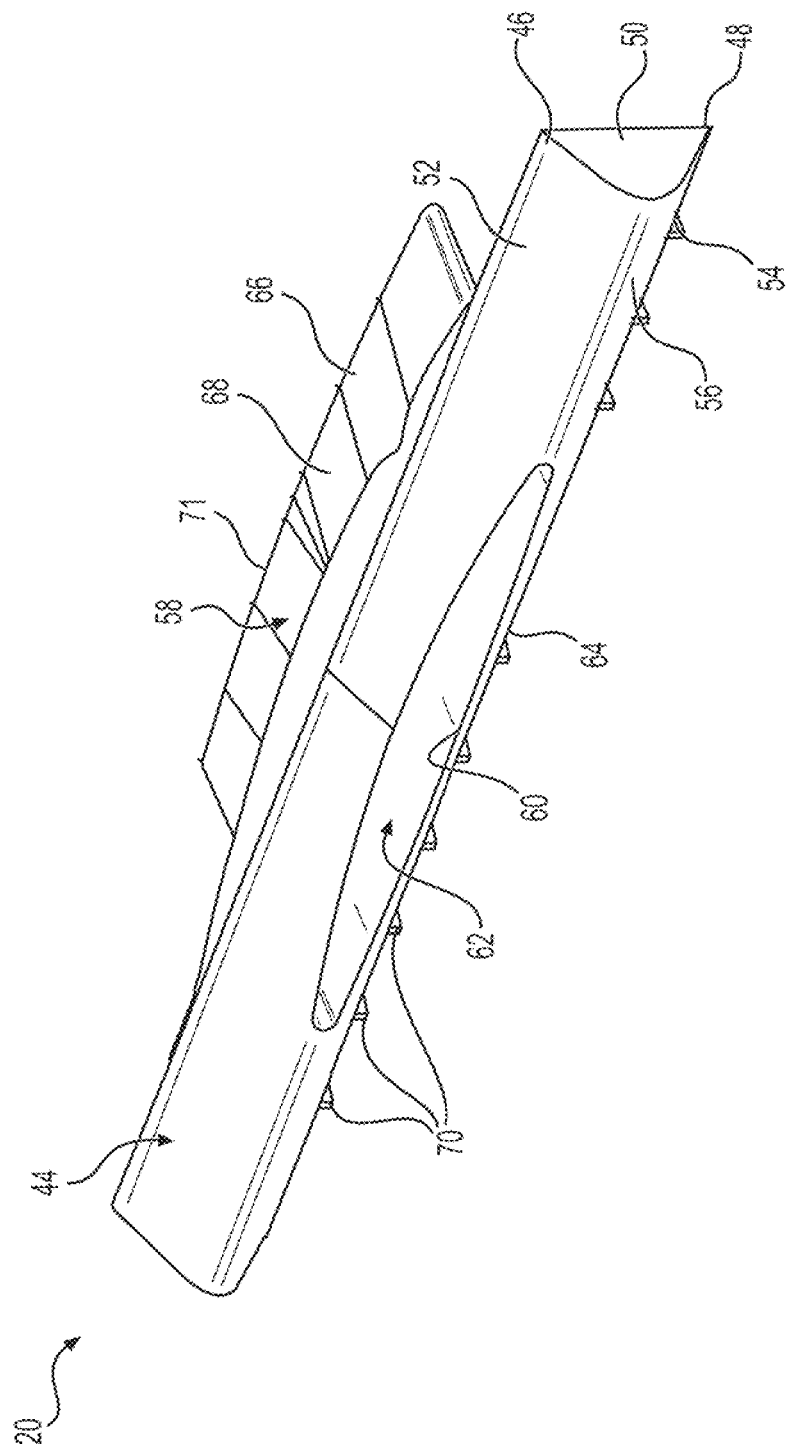
FIG. 7 is a perspective view of the air diffuser assembly including a plurality of guide blades.
Figure 8:
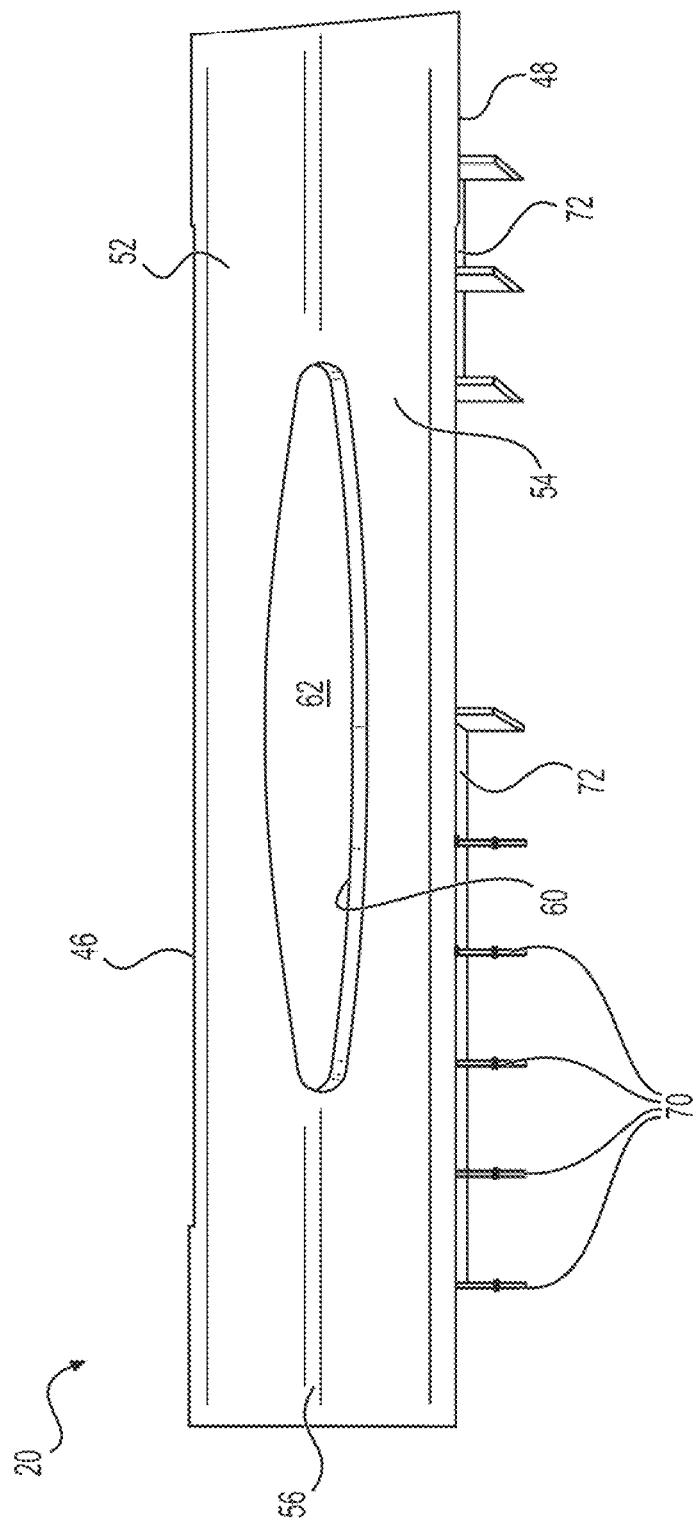
FIG. 8 is an enlarged front view of the air diffuser assembly and guide blades.

The main body 44 defines an air tunnel diffuser 58 that extends through the main body 44 to guide a portion of the airflow through the wind deflection portion 56 and towards a rear of the automobile. More particularly, the air tunnel diffuser 58 includes an interior wall 60 that delimits an air passage 62 extending from an airflow entry 64 disposed adjacent to the wind deflection portion 56 to an airflow exit 66 for guiding airflow therethrough towards the rear portion of the automobile. In an embodiment of the air diffuser assembly 20, the air passage 62 may be extended via a tail 68 that extends from the airflow entry 64 to a tail end 71 disposed rearward of the main body 44 and adjacent the airflow exit 66. As best shown in FIGS. 3 and 6, the tail 68 may be sized to fit within the slit 38 of the twist beam 24 and include a notch 67 (FIG. 3) one either side for accommodating the sway bar 40. As best illustrated in FIGS. 4A through 4D, the tail 68 can be custom shaped to fit over or redirect air from encumbrances associated with the undercarriage of the vehicle, such as under a spare tire. In addition, the tail 68 can be sized to extend under part or the entirety of the spare tire 42, which may be located in a spare tire well under the vehicle undercarriage. In addition, the tail 68 may be angled relative to the main body 44 to direct the airstream upwardly, downwardly, left, and/or right. As shown in FIG. 4C, the tail 68 may be angled slightly downwardly so as to aim the airstream away from the undercarriage but not at a steep enough of an angle that the airstream creates a positive lift and diminishes steering capability, for example 0° to 45° or 5° to 30°. As shown in FIG. 4D, the tail 68 may split the airstream via the interior wall 60 such that part of the airstream is guided one direction and the other portion is guided in another direction, preferably the opposite direction.

It is preferable that the interior wall 60 is conically shaped such that a cross-sectional shape of the air passage 62 adjacent the airflow entry 64 is different, and more preferably larger, than a cross-sectional shape of the air passage 62 adjacent of the airflow exit 66, as best shown in FIGS. 4A and 4B. This narrowing cross-sectional shape of the air passage 62 enables a velocity of the airflow exiting the air passage 62 via the airflow exit 66 to be greater than a velocity of air entering the airflow entry 64 of the air passage 62. The greater velocity and smaller cross-sectional volume of the guided air exiting the airflow exit 66 permits the guided air to hold its shape for a greater distance thus avoiding fragmenting or leaking airflow that affects other portions of the automobile. It should also be appreciated that the difference in size between the airflow entry 64 and the airflow exit 66 can be selected based on the end utility of the chosen automobile. For example, a faster moving automobile may benefit by having a smaller difference, no difference, or a reversed proportion in size. Moreover, in addition to varying sizes, the airflow entry 64 and airflow exit 66 may also include different shapes and dimensions.

As best illustrated in FIGS. 5 and 6, the air diffuser assembly 20 can be an OEM part, attached to the twist beam 24 of a new or used automobile via fasteners, adhesive, welding, straps, or other methods. While one air diffuser assembly 20 may be formed to be connected to multiple sized twist beams 24, it should also be appreciated that the assembly 20 can be formed for specific automobile designs. For example, the air diffuser assembly 20 can be produced to have a greater distance between longitudinal edges 46, 48 and/or latitudinal edges 50. Likewise, the tail 68 may be formed to mate with slits 38 of various sizes and locations and to fit around variously configured sway bars 40. The tail 68 may further be formed to fit around the sway bar 40, slits 38, or more generally the twist beam 24. Alternatively to being added after manufacture, the air diffuser assembly 20 may be attached to the twist beam 24 at an automobile manufacturing facility.

Figure 14:
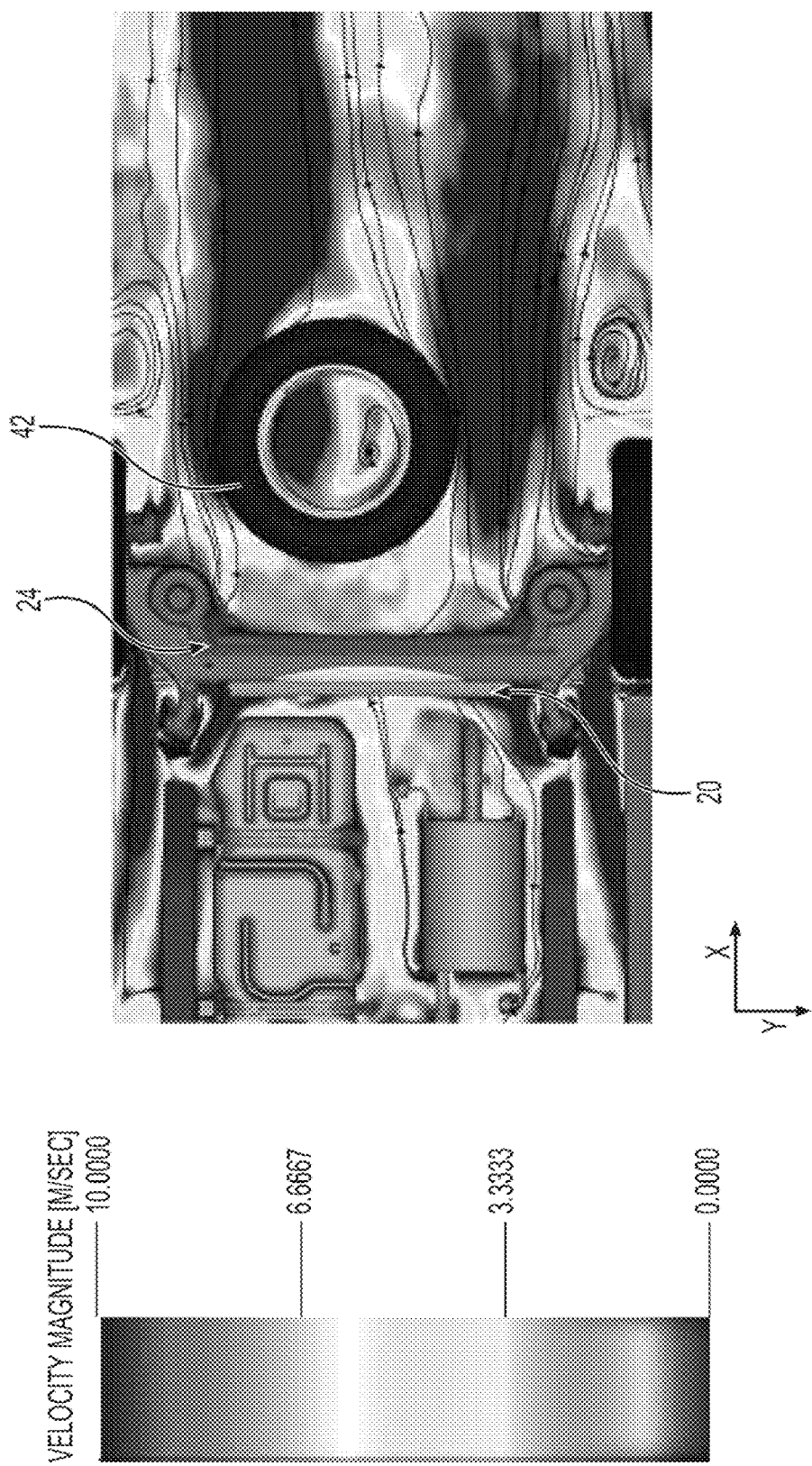
FIG. 14 is a bottom view of the automobile undercarriage including a graphical representation of the airstream around the air diffuser assembly located on the twist beam along the XY-plane.
Figure 15:
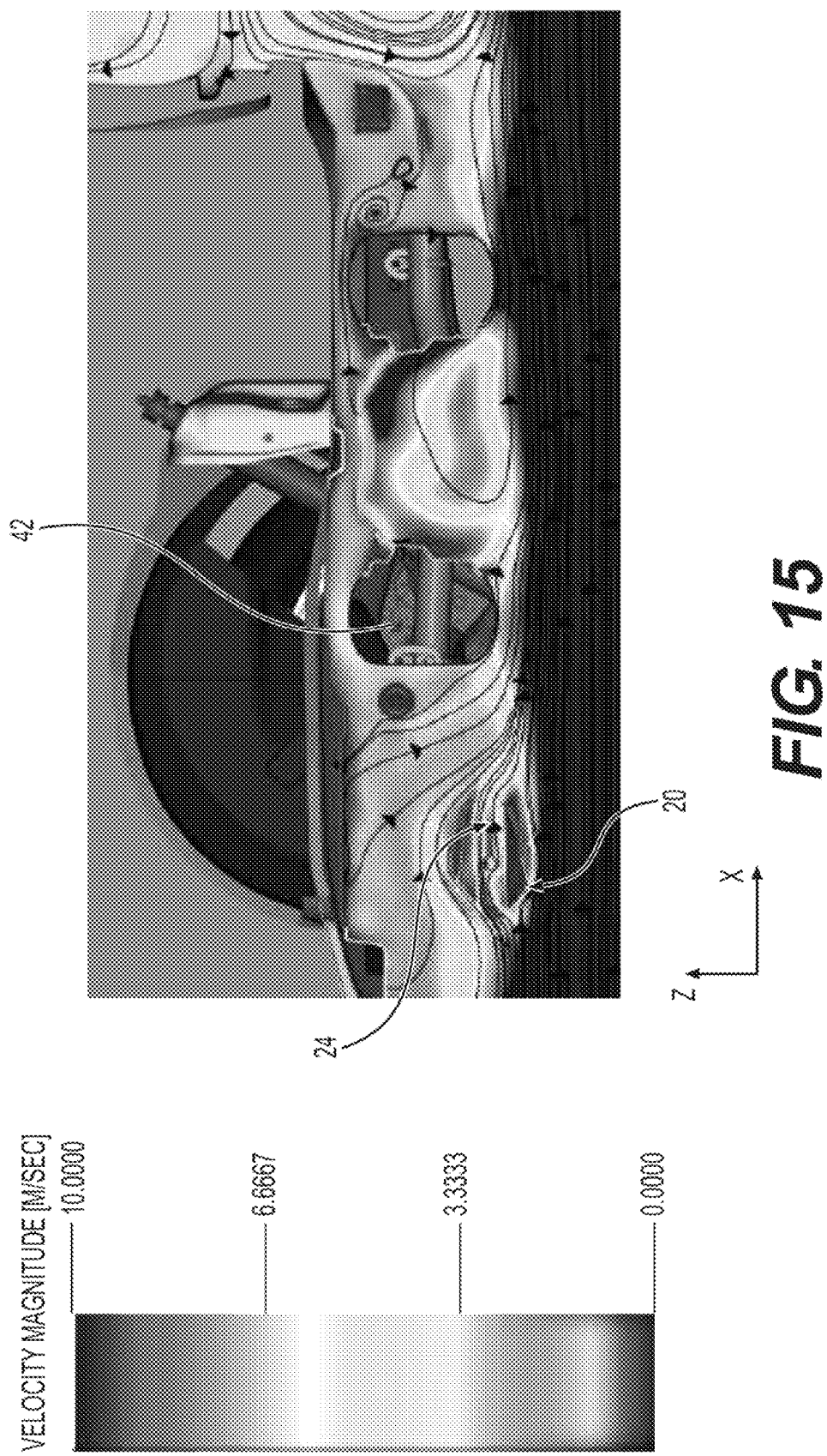
FIG. 15 is a side view of the automobile undercarriage including a graphical representation of the airstream around the air diffuser assembly located on the twist beam along the XZ-plane.

FIGS. 14 and 15 both illustrate a reduced obstruction to the airstream resulting from the air diffuser assembly 20 being attached to the twist beam 24 and a spare tire 42 located on a stern-side therefrom as a function of airstream velocity indicated in greyscale. FIG. 14 is a bottom view of the automobile undercarriage including a graphical representation of the airstream around the air diffuser assembly 20 located on the twist beam 24 along the XY-plane. Likewise, FIG. 15 is a side view of the automobile undercarriage including a representation of the airstream around the air diffuser assembly 20 located on the twist beam 24 along the XZ-plane also shown in greyscale. As represented, the air diffuser assembly 20 guides the airflow, greatly reducing positive lift and also reducing a circular airstream that gets caught in the spare tire 42. Tests performed at 112 kph indicate a Cd value of 0.347, a notable reduction over a twist beam 24 without an air diffuser assembly as shown in FIG. 12 that had a Cd value of 0.348 under the same testing conditions.

Figure 9:
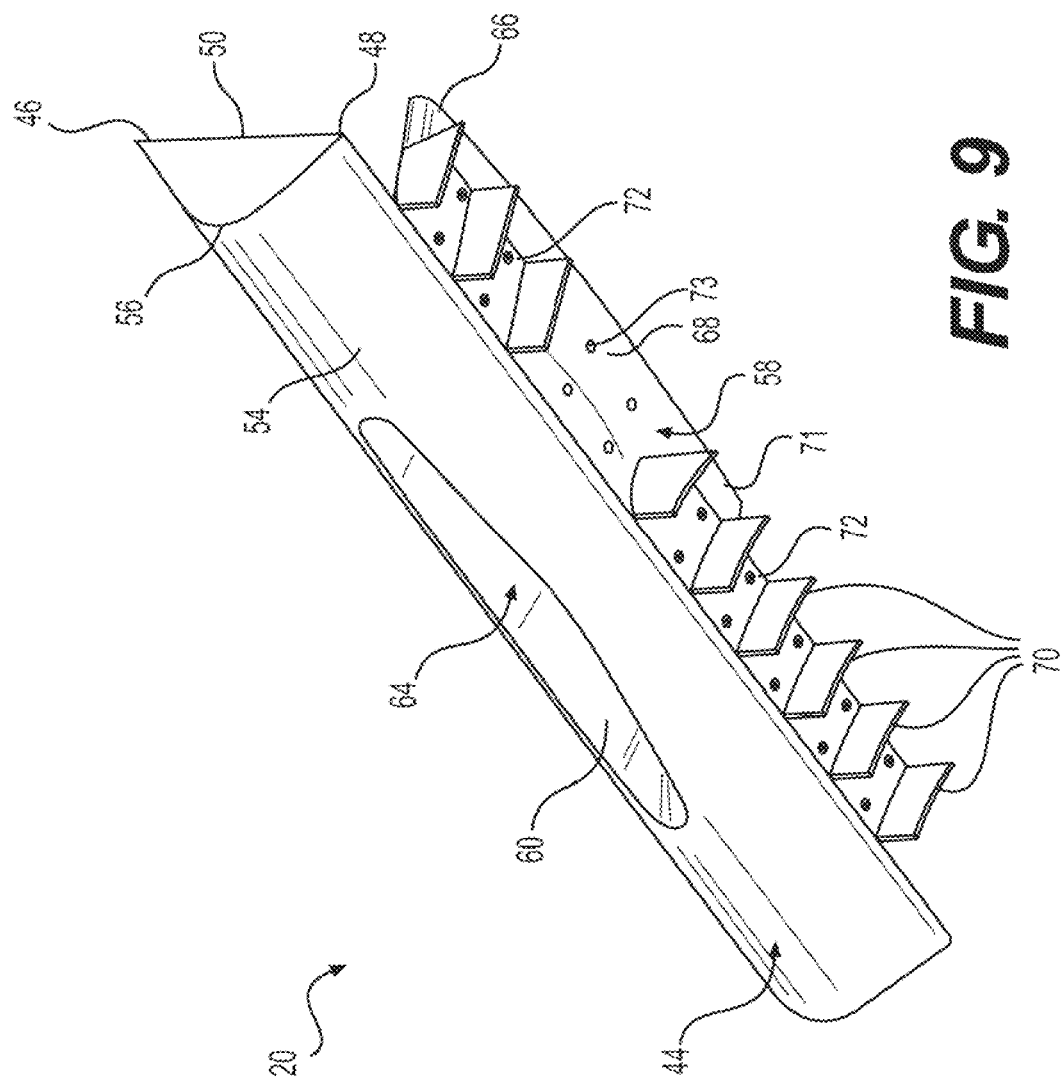
FIG. 9 is a perspective underside view of the air diffuser assembly and guide blades.
Figure 10:
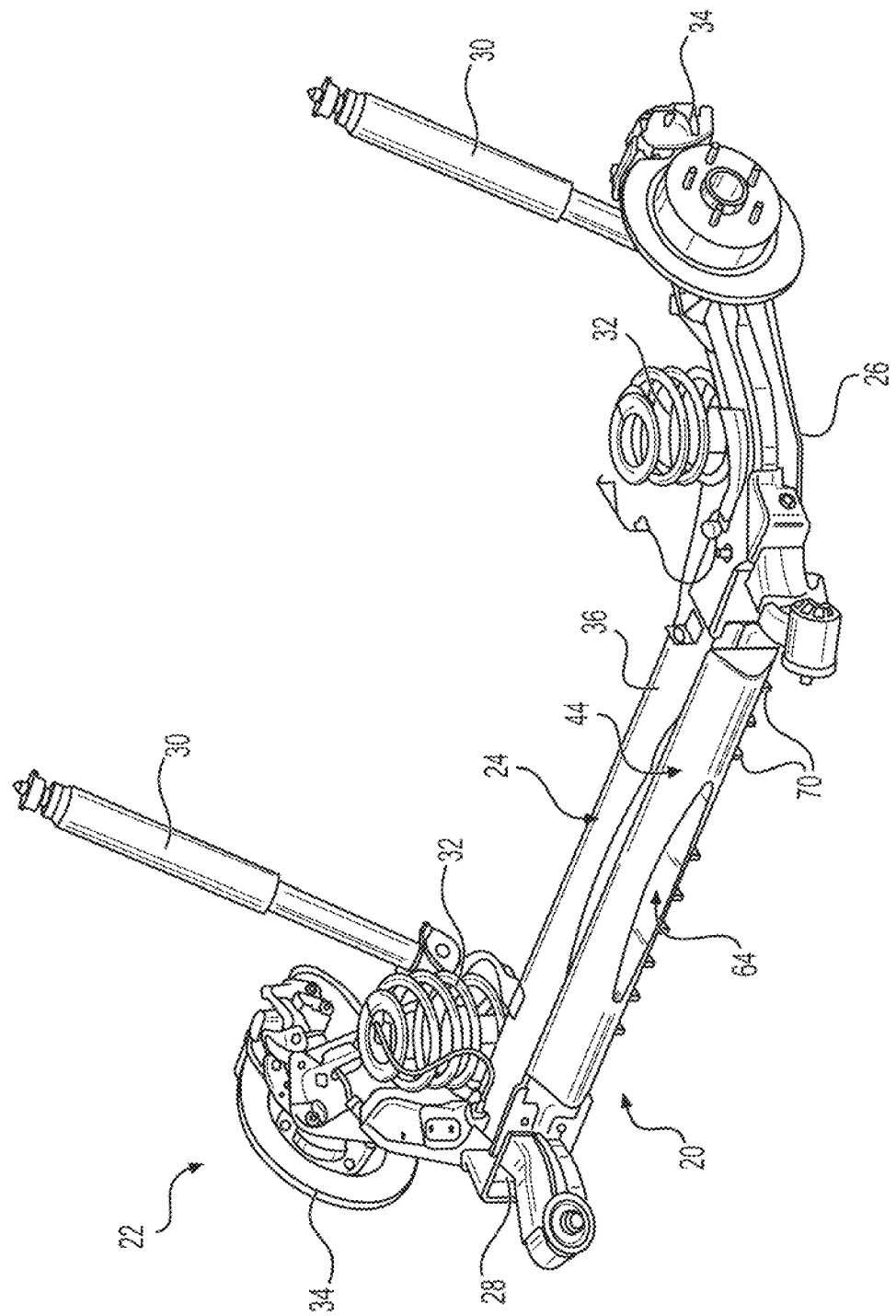
FIG. 10 is a perspective view of the air diffuser assembly with guide blades attached to the twist beam.
Figure 11:
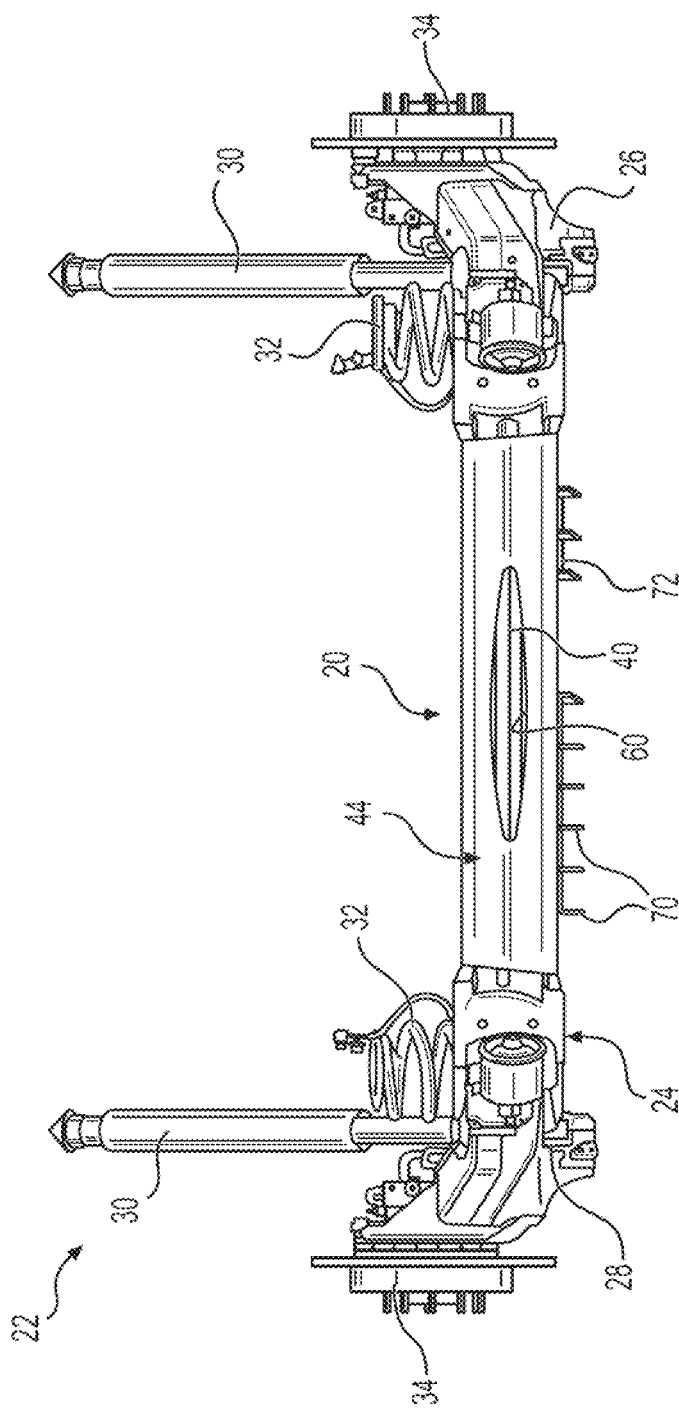
FIG. 11 is a front view of the air diffuser assembly with guide blades attached to the twist beam.

As best illustrated in FIGS. 7 through 11, in an embodiment the air diffuser assembly 20 can additionally include a plurality of guide blades 70 mounted to the bottom longitudinal edge 48 of the main body 44 via mounting plates 72. The guide blades 70 direct the airflow pushed downwardly by the second slope 54 further reducing the Cd value. As illustrated, the mounting plates 72 and associated guide blades 70 may be attached to the main body 44 in multiple arrangements. For example, there may be spaces between one or more mounting plates 72 or guide blades 70 that vary based upon a desired airflow. Likewise, the guide blades 70 can be disposed at one or more angles for directing the airflow into separate directions, to avoid obstacles such as the spare tire 42. For example, the guide blades 70 may extend at parallel or transverse angles from one another on the same or separate mounting plate 72. As best illustrated in FIG. 9, the mounting plates 72 may also be releasably attached to the main body 44 in various locations, for example via fasteners and apertures 73 extending through the mounting plates 72 and main body 44. As such, an end user can tailor the airstream direction based on the size, spacing, and orientation of the guide blades 70 for specific automobiles and automobiles undercarriages. For example, an end user can select preferred locations to attach one or more mounting plates 72 of various sizes that could each include guide blades 70 of different orientations and densities.

FIGS. 16 and 17 both illustrate the superior directed airstream resulting from the air diffuser assembly 20 with guide blades 70 being attached to the twist beam 24 and a spare tire 42 located on a stern-side therefrom. FIG. 16 is a bottom view of the automobile undercarriage and represents the airstream around the air diffuser assembly 20 having guide blades 70 along the XY-plane as a function of air stream velocity indicated by greyscale. Similarly, FIG. 17 is a side view of the automobile undercarriage including a representing the airstream around the air diffuser assembly having guide blades located on the twist beam along the XZ-plane as a function of airstream velocity also indicated by greyscale. As illustrated, there is a noticeable reduction in positive lift particularly from the part of the airstream deflected downwardly by the second slope. Tests performed at 112 kph indicate a Cd value of 0.344, an even greater reduction over the twist beam 24 without an air diffuser assembly 20 as shown in FIG. 12 that had a Cd value of 0.348 under the same testing conditions.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An air diffuser assembly for attachment to a twist beam on a rear suspension system of an automobile comprising:
   a main body including a wind deflection portion that is forward facing when the main body is attached to the twist beam for distributing an airflow; and
   an air tunnel diffuser extending from the wind deflection portion and including an interior wall delimiting an air passage that extends through the main body to guide a portion of the airflow through the wind deflection portion and towards a rear of the automobile.

2. The air diffuser assembly of claim 1, further including a tail extending from the main body opposite the wind deflection portion to a tail end, the air passage defined by the interior wall extending from an airflow entry disposed adjacent the wind deflection portion to an airflow exit disposed adjacent the tail end.

3. The air diffuser assembly of claim 2, wherein the airflow entry has a different dimension than the airflow exit.

4. The air diffuser assembly of claim 3, wherein the airflow entry of the airflow passage has a larger cross-sectional shape than the airflow exit for concentrating an output of the airflow as it exits the air tunnel diffuser.

5. The air diffuser assembly of claim 2, wherein the tail is disposed at an acute angle relative to the main body to dispose the airflow exit at a different elevation than the airflow entry when the main body is attached to the twist beam.

6. The air diffuser assembly of claim 5, wherein the airflow exit is disposed at a lower elevation than the airflow entry for guiding a portion of the airflow away from an automobile undercarriage when the main body is attached to the twist beam.

7. The air diffuser assembly of claim 2, wherein the tail is sized to fit within a slit in the twist beam when the air diffuser assembly is attached to the twist beam.

8. The air diffuser assembly of claim 2, wherein the tail defines at least one notch for accommodating a sway bar when the main body is attached to the twist beam.

9. The air diffuser assembly of claim 2, wherein the tail end is aimed at least partially under a spare tire well located on a undercarriage when the main body is attached to the twist beam.

10. The air diffuser assembly of claim 9, wherein the tail extends at least partially under the spare tire well when the main body is attached to the twist beam.

11. The air diffuser assembly of claim 1 further including at least one guide blade extending from the main body for distributing a portion of the airflow on either side of the at least one guide blade.

12. The air diffuser assembly of claim 11, wherein the at least one guide blade includes a plurality of guide blades located adjacent to a bottom longitudinal edge of the wind deflection portion.

13. The air diffuser assembly of claim 12, wherein the plurality of guide blades are disposed in a parallel relationship to one another.

14. The air diffuser assembly of claim 12, wherein the plurality of guide blades are disposed in a transverse relationship to one another.

15. The air diffuser assembly of claim 12, wherein the plurality of guide blades extend from at least one mounting plate attached to the main body.

16. The air diffuser assembly of claim 15, wherein the at least one mounting plate and the main body include apertures so that the at least one mounting plate can be selectively attached to more than one location of the main body with fasteners that extend through the apertures for tailoring the wind deflection route to a specific automotive undercarriage.

17. The air diffuser assembly of claim 16, wherein the at least one mounting plate includes a first mounting plate and a second mounting plate and the plurality of guide blades includes a first distribution of guide blades extending from the first mounting plate and a second distribution of guide blades extending from the second mounting plate, the first distribution of guide blades being different than the second distribution of guide blades.

18. The air diffuser assembly of claim 12, wherein the plurality of guide blades are distributed in a non-uniform spacing from one another.

19. The air diffuser assembly of claim 1, wherein the wind deflection portion extends between a top longitudinal edge and a bottom longitudinal edge that are spaced apart by a pair of lateral edges, wherein the wind deflection portion includes a first slope extending downwardly from the top longitudinal edge for deflecting a portion of the airflow that is not captured by the air tunnel diffuser.

20. The air diffuser assembly of claim 19, wherein the wind deflection portion further includes a second slope that extends upwardly from the bottom longitudinal edge for deflecting a portion of the airflow that is not captured by the air tunnel diffuser, the first slope and second slope meeting at a median edge for distributing the airflow between the first slope and the second slope.

* * * * *